United States Patent
Trautman et al.

(10) Patent No.: US 6,628,522 B2
(45) Date of Patent: Sep. 30, 2003

(54) THERMAL PERFORMANCE ENHANCEMENT OF HEAT SINKS USING ACTIVE SURFACE FEATURES FOR BOUNDARY LAYER MANIPULATIONS

(75) Inventors: Mark A. Trautman, Aloha, OR (US); Paul B. Koeneman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 09/941,312

(22) Filed: Aug. 29, 2001

(65) Prior Publication Data

US 2003/0043531 A1 Mar. 6, 2003

(51) Int. Cl.[7] ............................................. H05K 7/20
(52) U.S. Cl. ..................... 361/704; 62/3.2; 62/259.2; 165/80.2; 165/80.3; 165/185; 257/722; 361/690; 361/705; 361/708; 361/710
(58) Field of Search ............................. 165/80.2, 80.3, 165/185, 121–126, 276; 174/16.3; 257/722, 718–719; 361/690, 694–695, 697, 704–710, 714–721; 456/184; 62/259.2, 3.2

(56) References Cited

U.S. PATENT DOCUMENTS

| | | | |
|---|---|---|---|
| 5,473,506 | * 12/1995 | Kikinis | 361/704 |
| 6,016,250 | * 1/2000 | Hanners | 361/695 |

FOREIGN PATENT DOCUMENTS

| | | | | |
|---|---|---|---|---|
| JP | 59-87844 | * | 5/1984 | 257/722 |
| JP | 40-3070162 | * | 8/1989 | 257/718 |
| JP | 1-276753 | * | 11/1989 | 257/722 |

* cited by examiner

*Primary Examiner*—Gregory Thompson
(74) *Attorney, Agent, or Firm*—Blakely, Sokoloff, Taylor & Zafman LLP

(57) ABSTRACT

Cilia-like micro surface actuators are applied to fins of a heat sink to improve heat dissipation. The surface actuators act as active surface features whose motion disrupts the boundary layer fluid flow by entraining cool fluid towards the heat transfer surfaces of the fins and ejecting relatively warmer fluid away from the surfaces. This disruption reduces the thermal resistance between the heat sink fins and the fluid (e.g., the convection resistance). The motion of the surface actuators also induces a net flow along the surface of the fin(s) and can, therefore, be viewed analogously to a "pump" moving fluid (such as air) over the surface. The surface actuators can be fabricated using plastic microelectromechanical systems (MEMS) technology and can be actuated to generate their motion using several techniques.

34 Claims, 1 Drawing Sheet

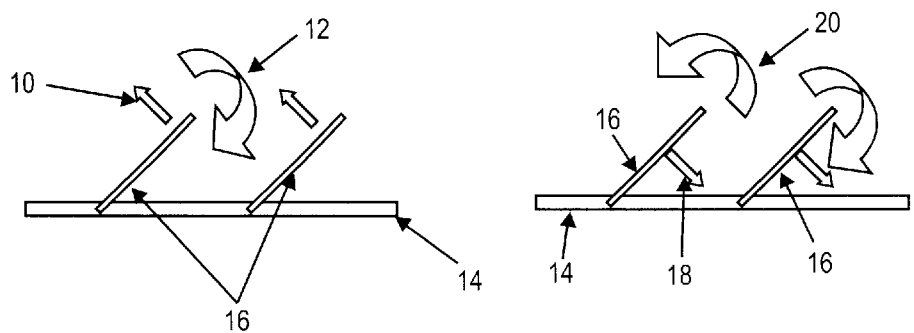
FIG. 1     FIG. 2
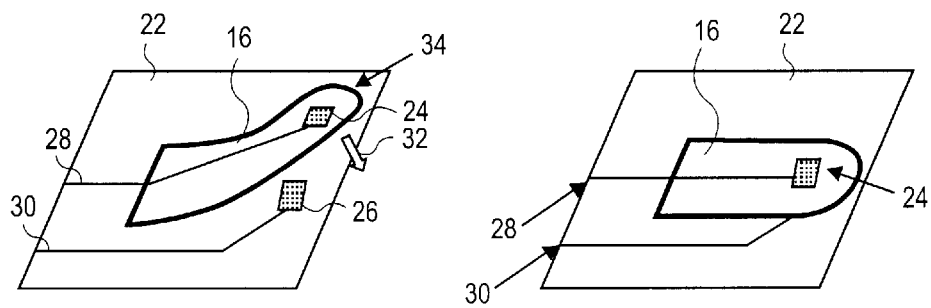
FIG. 3     FIG. 4

THERMAL PERFORMANCE ENHANCEMENT OF HEAT SINKS USING ACTIVE SURFACE FEATURES FOR BOUNDARY LAYER MANIPULATIONS

TECHNICAL FIELD

This disclosure relates generally to microelectromechanical systems (MEMS), and in particular but not exclusively, relates to MEMS devices to improve fluid flow, such for the enhancement of thermal performance of heat sinks.

BACKGROUND

Many devices generate heat when they operate. For instance, as computer processors increase in speed of operation, the amount of heat generated by the processors increases. To prevent such devices from overheating and for reliability purposes, the generated heat must be dissipated or otherwise taken away from the devices.

A common technique to dissipate heat is to attach heat sinks to the devices. Heat sinks are typically made from copper or other suitable heat-conductive material, and often include "fins" to increase its surface area for heat dissipation. In operation, a heat sink conducts heat away from a device and dissipates the heat through its fins, sometimes with the aid of a fan that blows across the fins.

In performing this heat transfer, two types of thermal resistances are encountered. Conduction resistance is encountered when heat is transferred between solid materials. In this case, use of a good heat conductive material, such as copper for the heat sink, allows for more efficient heat transfer away from the device.

Convection resistance is encountered when transferring heat from a solid material, such as from surfaces of the fins of the heat sink, to the surrounding fluid (e.g., the surrounding fluid is air in this instance). A thick boundary layer forms along each fin, thereby reducing the effectiveness of air cooling. That is, the thickness of the boundary layer decreases the heat transfer surface's (e.g., the fins') efficiency to reject heat to the surrounding fluid. Moreover, the use of an additional fan to aid in heat dissipation from the heat sink further increases inefficiency of the overall system.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 illustrates a first surface actuator motion to entrain a fluid towards a surface in accordance with an embodiment of the invention.

FIG. 2 illustrates a second surface actuator motion to eject a fluid away from the surface in accordance with an embodiment of the invention.

FIGS. 3 and 4 illustrate fabrication and actuation of a surface actuator in accordance with an embodiment of the invention.

DETAILED DESCRIPTION OF THE ILLUSTRATED EMBODIMENTS

Embodiments of an apparatus and method for improving fluid flow, such as heat dissipation from a heat sink, via use of surface actuators are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention comprises "cilia-like" micro surface actuators that can be applied to fins of a heat sink, in one embodiment, to improve heat dissipation. The surface actuators act as active surface features whose motion disrupts the boundary layer airflow by entraining cool air towards heat transfer surfaces of the fins and ejecting relatively warmer air away from the surfaces. This disruption reduces the thermal resistance between the heat sink fin and the air (e.g., the convection resistance), which is the largest contributor to the total heat sink resistance.

In an embodiment, the motion of the surface actuators also induces a net flow along the surface of the fin(s) and can, therefore, be viewed analogously to a "pump" moving fluid over the surface. According to one embodiment, the surface actuators can be fabricated using plastic MEMS technology and can be actuated to generate their motion using several techniques described below.

It is noted that the term "fluid" as used herein is intended to include both liquids or gases (such as air). Where appropriate to specifically illustrate a particular embodiment, "air" is used to denote the fluid. Moreover, embodiments of the invention will be described herein as being implemented on heat sinks, for purposes of specifically explaining one possible implementation. It is to be appreciated that embodiments of the invention may be implemented for devices other than heat sinks, some of which are described below.

FIG. 1 illustrates a first surface actuator motion 10 to entrain (e.g., draw or pull) a fluid 12 towards a surface 14 of a device. In one embodiment, the surface 14 can comprise a surface of a heat sink or of a heat sink fin. The geometry of the surface 14 may be flat, curved, pin fin, or other shape. A plurality of micro surface actuators 16 is coupled (such as by affixing) to the surface 14, according to various techniques that will be described later below. The surface actuators 16 move in the direction of the first surface actuator motion 10 to entrain the fluid 12.

FIG. 2 illustrates a second surface actuator motion 18 to eject a fluid 20 away from the surface 14 of the device. In this illustration, the surface actuators 16 move in the direction of the second surface actuator motion 18 (in reverse to the direction of the first surface actuator motion 10) to eject the fluid 20. In one embodiment, such as for a heat sink implementation, the fluids 12 and 20 comprise air, and the fluid 12 has a cooler temperature relative to the fluid 20. In other implementations, cooler fluid may be ejected from the surface 14, and relatively warmer fluid may be entrained towards the surface 14.

Movement of the surface actuators 16 according to the first or second actuator motions 10 and 18, respectively, disrupts or otherwise manipulates the boundary layer airflow along the surface 14. This disruption reduces the thermal convection resistance along the surface 14, and therefore, enhances thermal performance of the device—the surface actuators 16 create a mixing, turbulating, and/or pumping action in the boundary layer that runs along the heat transfer surface 14, which allows heat to more easily dissipate from the surface 14.

In one embodiment, each surface actuator 16 can be coupled to an actuation controller (described later below in conjunction with FIGS. 3–4) to allow individual control of each surface actuator 16 by the actuation controller. Hence, this embodiment provides a granular-level control of movement of individual surface actuators 16. The surface actuators 16 can be controlled to all move in unison according to the first surface actuator motion 10 and according to the second surface actuator motion 18, in one embodiment. In another embodiment, the surface actuators 16 may move in a more random and non-unison manner.

Alternatively or in addition in an embodiment, groups of surface actuators 16 can be controlled by the actuation controller(s) to move successively (in groups) in either the first or second actuator motions 10 and 18 to induce a net flow along the surface 14. That is, groups of surface actuators 16 can be actuated to motion in "waves" or in "phased" manner, to generate a surface movement similar in appearance to ripples or traveling/undulating waves. This successive movement of groups of surface actuators 16, therefore, acts like a pump that moves fluid over the surface 14. In an embodiment, groups of surface actuators 16 can be actuated in this manner along a predetermined path along the surface 14, thereby creating "channels" through which fluid may flow. If faster fluid movement or heat transfer is desired, a fan may be used to blow air across the surface actuators 16, although the pumping action of the surface actuators 16 substantially. removes the need for an additional fan.

In an embodiment, motion of the surface actuators 16 according to the first surface actuator motion 10 of FIG. 1 can be anywhere between 0 degrees (e.g., parallel to the surface 14) and 180 degrees, if necessary. Motion of the surface actuators 16 according to the second surface actuator motion 18 of FIG. 2 can also be anywhere between 0 degrees and 180 degrees. The motion speed can be designed and optimized depending on the amount of desired pumping action, and can be between 20 Hz and 15 kHz, for instance, according to various embodiments.

FIGS. 3 and 4 illustrate fabrication and actuation of a surface actuator 16 in accordance with an embodiment of the invention. The surface actuator(s) 16 can be fabricated using plastic MEMS technology in one embodiment, where the individual surface actuators 16 comprise plastic MEMS structures. In other embodiments, metal foil or silicon-based solutions (which may not necessarily be MEMS-based structures) may be used. Example dimensions of the actuators 16 can be 10–100 microns in thickness, and 10 microns to several millimeters in length, width, and separation between surface actuators 16. The geometries of the surface actuators 16 can be rectangular, elliptical or other arcuate shape, annular, paddle, curl-up tab, or other suitable shapes.

In the embodiments shown in FIGS. 3–4, the surface actuator(s) 16 can be disposed on a tape material 22 that is capable of being affixed to the surface 14, such as via an adhesive material on the tape material's 22 surface that is opposite to the tape surface having the surface actuators 16.

The tape material 22 can comprise a multi-layer flexible tape (sometimes referred to as "flex tape" that is usable for flexible circuitry), in one embodiment, where one layer of the tape material 22 includes the surface actuators 16 and a second layer includes at least some of the electronic components (such as electrical lines) for the actuation controller, with a layer between the first and second layers comprising an intermediate plastic layer. For the sake of simplicity, these multiple-layers are not illustrated in detail in FIGS. 3–4. A type of tape material 22 that can be used in one embodiment of the invention is Kapton® polyimide film, available from DuPont® High Performance Materials, P.O. Box 89, Route 23 South and DuPont Road, Circleville, Ohio 43113.

An actuation controller is coupled to at least some of the surface actuators 16. For instance in an un-actuated state of FIG. 3, process-induced residual stress or thermal stress curls the surface actuator 16 at 34. When activated, the actuation controller is coupled to trigger movement of its corresponding surface actuator 16 in a first actuator motion (e.g., in a direction 32) to eject fluid away from the heat transfer surface 14.

In one embodiment, the actuation controller comprises a first capacitor plate 24 affixed to one of the surface actuators 16. A second capacitor plate 26 is affixed separately from that surface actuator 16. First and second electrical lines 28 and 30 are coupled, respectively, to the first and second capacitor plates 24 and 26. Application of a voltage to the capacitor plates 24 and 26, via the first and second electrical lines 28 and 30, generates an electrostatic force between the capacitor plates 24 and 26 to trigger actuator motion of that surface actuator 16, resulting in the surface actuator position shown in FIG. 4 that is achieved via electrostatic attraction. Removal or reduction of the applied voltage to the capacitor plates 24 and 26 allows the surface actuator 16 to return to its original curled position at 34 in a second actuator motion to entrain fluid towards the surface.

As mentioned above, a multi-layer tape material can be used for the tape material 22. In such an embodiment, the first capacitor plate 24 and the surface actuators 16 can be affixed to the first layer of the tape material 22, and the second capacitor plate 26 can be affixed to the second layer of the tape material 22. The electrical lines 28 and 30 can be disposed on the same layers as their respective capacitor plates 24 and 26, or they may cross into different layers.

Multiple first capacitor plates 24 may share a single common second capacitor plate 26 in one embodiment, thereby allowing groups of surface actuators 16 to be successively actuated for the pumping action. A bus connection of multiple electrical lines 28 and 30 can be used to perform the successive activation of the groups of surface actuators 16. Alternatively or in addition, individual control of specific surface actuators 16 can be obtained via use of separate electrical lines and capacitor plates for each surface actuator 16 (e.g., separate electrical addressing).

In another embodiment, the actuation controller comprises a magnetic coil, where in an un-actuated state, the surface actuators 16 lie flat against the surface 14 (similar to what is shown in FIG. 4). The magnetic coil can be positioned such that application of a current through the magnetic coil generates an electromagnetic force to trigger actuator motion (of surface actuators 16 corresponding to that actuation controller) away from the surface 14, towards the curl position 34 such as shown in FIG. 3.

Although electromagnetic and electrostatic actuation have been described above, it is to be appreciated that other embodiments of the invention can use different types of actuation techniques by the actuation controller to trigger motion of the surface actuators 16. Piezoelectric actuation controllers may be used in one embodiment. Magnetostrictive actuation controllers may be used in another embodiment, where actuation is performed via use of a material that causes strain when exposed to a magnetic field. Bi-metallic strip controllers may be used in yet another embodiment, where two materials with different coefficients of expansion (such as copper or aluminum) are sandwiched together-when current is passed through one or both materials, one of the materials heats up and curls/expands more than the other. With shape-memory alloy actuation controllers, a material can be chosen that returns to a base shape that it memorizes. This is intended to be a non-exhaustive list of example actuation techniques that can be used by various embodiments of the invention.

As described above, the surface actuators 16 can be coupled to a device such as a heat sink or fins thereof. It is to be appreciated that the surface actuators 16 can be directly coupled to many other types of devices, without necessarily having to be coupled to a heat sink. For instance, the surface actuators 16 can be directly coupled to or formed on devices such as dies for processors, memory chips, or semiconductor-based lasers. In other implementations, the surface actuators can be applied to interior surfaces of channels or tubes to improve fluid flow and heat transfer.

The surface actuators 16 may be coupled to or formed on biomedical devices in one embodiment. With this implementation, the motion of the surface actuators 16 can be used to pump chemicals, blood, or other liquids or gases. Fluidics control devices may also implement the surface actuators 16, such as for fluid logic circuits.

As evident from the above, an embodiment of the invention reduces the need to implement more expensive and complex cooling technologies, such as refrigeration, chemical vapor deposition (CVD) diamond heat spreader, and system-level liquid cooling. Reducing the cost of the thermal solution can reduce the overall system cost, and consequently, grow the market in which the particular device is sold. For instance, the increased cooling capability can allow processor designs to assume a lower junction temperature, which would allow increased performance and improve chip yield, since silicon components that would otherwise be rejected (due to poor heat performance) can now be used instead of thrown away.

Moreover, an embodiment of the invention provides an active cooling solution and can be used in applications requiring precise temperature control. The simple construction of the surface actuators 16 also lends itself to high-volume (and consequently low cost) manufacturing techniques.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a plurality of micro surface actuators coupleable to a heat sink surface; and
   an actuation controller coupled to at least some of the surface actuators, the actuation controller coupled to trigger movement of its corresponding surface actuators in a first actuator motion to entrain a fluid towards the heat sink surface and in a second actuator motion to eject the fluid away from the heat sink surface, the first and second actuator motions to pump the fluid across the heat sink surface.

2. The apparatus of claim 1 wherein the fluid comprises air, and wherein the fluid has a cooler temperature when entrained than when ejected.

3. The apparatus of claim 1 wherein the heat sink surface comprises a surface of a fin.

4. The apparatus of claim 1 further comprising a plurality of actuation controllers, each one of the plurality of actuation controllers coupled to a corresponding one of the plurality of micro surface actuators to allow individual control of the corresponding one of the plurality of micro surface actuators.

5. The apparatus of claim 1 wherein the surface actuators are disposed on a tape material capable of being affixed to the heat sink surface.

6. The apparatus of claim 1 wherein the actuation controller comprises:
   a first capacitor plate affixed to one of the surface actuators;
   a second capacitor plate affixed separately from that surface actuator; and
   first and second electrical lines coupled to the first and second capacitor plates, respectively, wherein application of a voltage to the capacitor plates via the first and second electrical lines generate an electrostatic force between the capacitor plates to trigger actuator motion of that surface actuator.

7. The apparatus of claim 6 wherein the first capacitor plate and the surface actuators are affixed to a first layer of a multi-layer tape material, and wherein the second capacitor plate is affixed to a second layer of the tape material.

8. The apparatus of claim 1 wherein the actuation controller comprises a magnetic coil, wherein application of a current through the magnetic coil generates an electromagnetic force to trigger actuator motion of the at least some of the surface actuators.

9. The apparatus of claim 1 wherein the actuation controller comprises one of a piezoelectric controller, a magnetostrictive controller, bi-metallic strip controller, or a shape-memory alloy controller.

10. The apparatus of claim 1 wherein the actuation controller is coupled to different groups of surface actuators to trigger successive movement of the groups of actuators in either the first or second actuator motions to induce a flow along the heat sink surface.

11. The apparatus of claim 1 wherein the surface actuators comprise plastic microelectromechanical systems (MEMS) structures.

12. An apparatus, comprising:
   a plurality of micro surface actuators coupleable to a surface of a device; and
   an actuation controller coupled to at least some of the surface actuators, the actuation controller coupled to trigger movement of its corresponding surface actuators in a first actuator motion to entrain a fluid towards the surface of the device and in a second actuator motion to eject the fluid away from the surface of the device the first and second actuator motions to pump the fluid across the surface of the device.

13. The apparatus of claim 12 wherein the device comprises a heat sink.

14. The apparatus of claim 12 wherein the device comprises one of a die for a processor, memory, or semiconductor-based laser.

15. The apparatus of claim 12 wherein the device comprises a bio-medical device.

16. The apparatus of claim 12 wherein the device comprises a fluidics control device.

17. The apparatus of claim 12 wherein the fluid comprises air, and wherein the fluid has a cooler temperature when entrained than when ejected.

18. The apparatus of claim 12 wherein the actuation controller comprises:
    a first capacitor plate affixed to one of the surface actuators;
    a second capacitor plate affixed separately from that surface actuator; and
    first and second electrical lines coupled to the first and second capacitor plates, respectively, wherein application of a voltage to the capacitor plates via the first and second electrical lines generate an electrostatic force between the capacitor plates to trigger actuator motion of that surface actuator.

19. The apparatus of claim 12 wherein the actuation controller comprises a magnetic coil, wherein application of a current through the magnetic coil generates an electromagnetic force to trigger actuator motion of the at least some of the surface actuators.

20. The apparatus of claim 12 wherein the actuation controller is coupled to different groups of surface actuators to trigger successive movement of the groups of actuators in either the first or second actuator motions to induce a flow along the surface of the device.

21. The apparatus of claim 12 wherein the surface actuators comprise plastic microelectromechanical systems (MEMS) structures.

22. A system, comprising:
    a device having a surface;
    a plurality of micro surface actuators coupled to the surface of the device; and
    an actuation controller coupled to at least some of the surface actuators, the actuation controller coupled to trigger movement of its corresponding surface actuators in a first actuator motion to entrain a fluid towards the surface of the device and in a second actuator motion to eject the fluid away from the surface of the devices, the first and second actuator motions to pump the fluid across the surface of the device.

23. The system of claim 22 wherein the device comprises one of a heat sink, die, bio-medical device, or fluidics control device.

24. The system of claim 22 wherein the actuation controller comprises:
    a first capacitor plate affixed to one of the surface actuators;
    a second capacitor plate affixed separately from that surface actuator; and
    first and second electrical lines coupled to the first and second capacitor plates, respectively, wherein application of a voltage to the capacitor plates via the first and second electrical lines generate an electrostatic force between the capacitor plates to trigger actuator motion of that surface actuator.

25. The system of claim 22 wherein the actuation controller comprises a magnetic coil, wherein application of a current through the magnetic coil generates an electromagnetic force to trigger actuator motion of surface actuators the at least some of the surface actuators.

26. The system of claim 22 wherein the actuation controller is coupled to different groups of surface actuators to trigger successive movement of the groups of actuators in either the first or second actuator motions to induce a flow along the surface of the device.

27. A method, comprising:
    triggering movement of micro surface actuators coupled to a surface of a device in a first actuator motion to entrain a fluid towards the surface of the device; and
    triggering movement of the surface actuators in a second actuator motion to eject the fluid away from the surface of the device the first and second actuator motions to pump the fluid across the surface of the device.

28. The method of claim 27 wherein triggering movement of the surface actuators in either the first or second actuator motions comprises applying a voltage between a first capacitor plate affixed to one of the surface actuators and a second capacitor plate affixed separately from that surface actuator to generate an electrostatic force to move that surface actuator.

29. The method of claim 27 wherein triggering movement of the surface actuators in either the first or second actuator motions comprises applying a current through a magnetic coil to generate an electromagnetic force to move at least some of the surface actuators.

30. The method of claim 27 wherein triggering movement of the surface actuators comprises controlling different groups of surface actuators to move successively in either the first or second actuator motions to induce a flow along the surface of the device.

31. An apparatus, comprising:
    a plurality of micro surface actuators coupleable to a heat sink surface; and
    an actuation controller coupled to at least some of the surface actuators, the actuation controller coupled to trigger fluttering movement of its corresponding surface actuators in a first actuator motion to entrain a fluid towards the heat sink surface and in a second actuator motion to eject the fluid away from the heat sink surface.

32. The apparatus of claim 31 wherein the fluid comprises air, and wherein the fluid has a cooler temperature when entrained than when ejected.

33. The apparatus of claim 31 wherein the actuation controller is electrically coupled to the at least some of the surface actuators.

34. The apparatus of claim 33 wherein the actuation controller comprises:
    a first capacitor plate affixed to one of the surface actuators;
    a second capacitor plate affixed separately from that surface actuator; and
    first and second electrical lines coupled to the first and second capacitor plates, respectively, wherein application of a voltage to the capacitor plates via the first and second electrical lines generate an electrostatic force between the capacitor plates to trigger actuator motion of that surface actuator.

* * * * *